C. H. KOLLING.
SAFETY DEVICE FOR PHONOGRAPHS.
APPLICATION FILED AUG. 9, 1920.
1,400,079.
Patented Dec. 13, 1921.
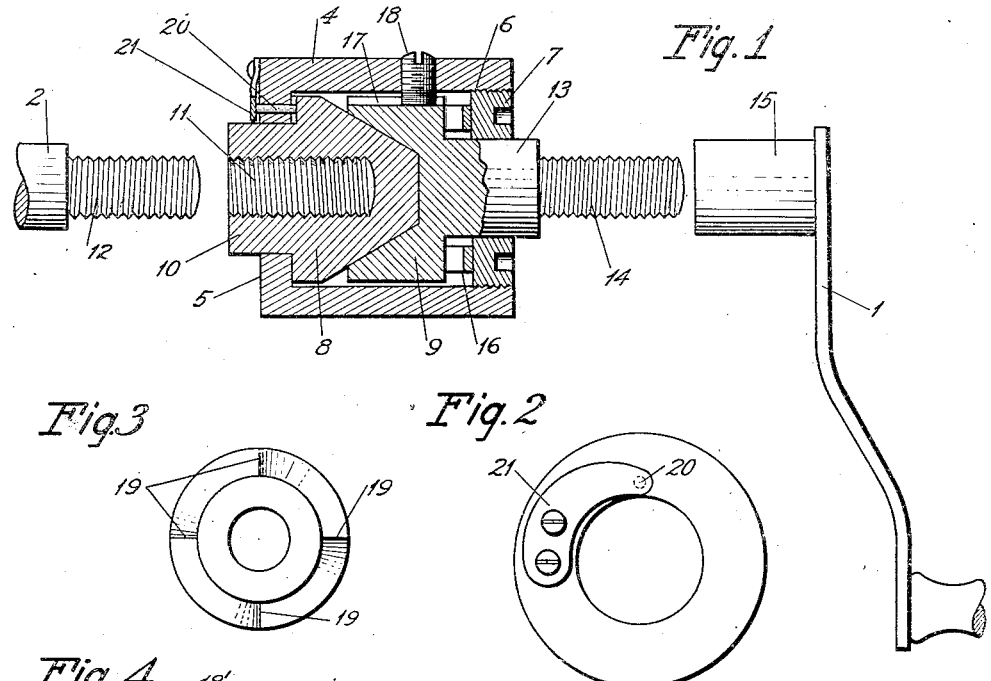
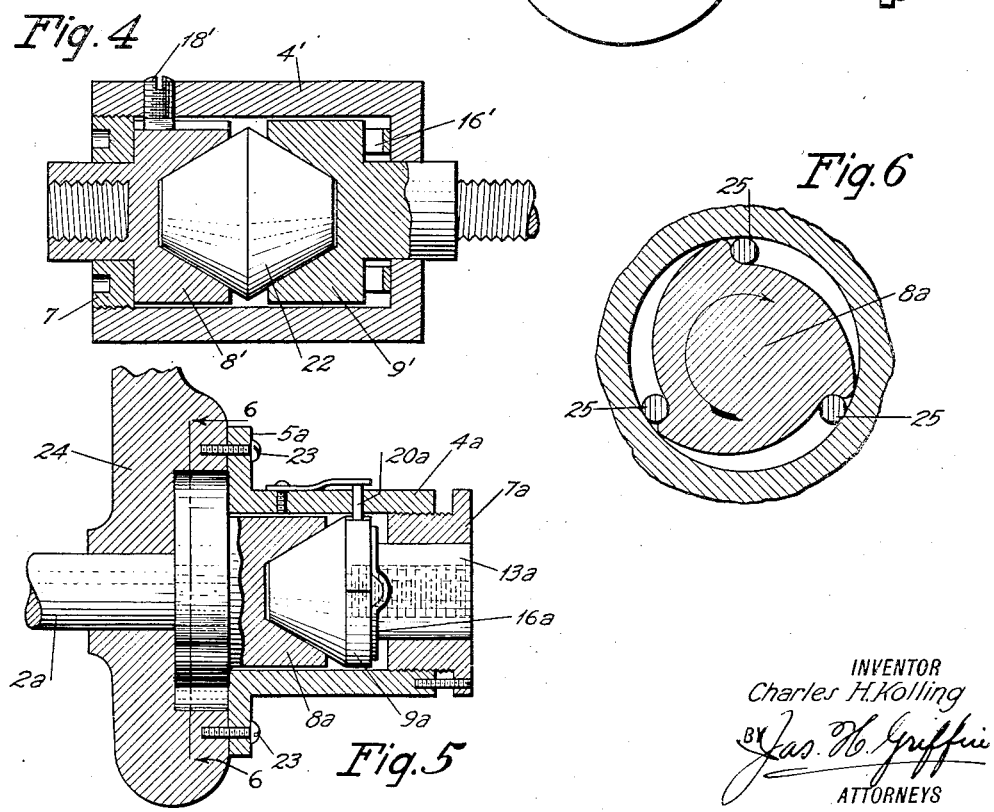
INVENTOR
Charles H. Kolling
BY Jas. H. Griffin
ATTORNEYS

UNITED STATES PATENT OFFICE.

CHARLES H. KOLLING, OF JERSEY CITY, NEW JERSEY, ASSIGNOR OF ONE-FOURTH TO OSCAR A. WEISSENBORN AND ONE-FOURTH TO REINHOLD PRIETZ, BOTH OF JERSEY CITY, NEW JERSEY.

SAFETY DEVICE FOR PHONOGRAPHS.

1,400,079.  Specification of Letters Patent.  Patented Dec. 13, 1921.

Application filed August 9, 1920. Serial No. 402,214.

*To all whom it may concern:*

Be it known that I, CHARLES H. KOLLING, a citizen of the United States, residing at Jersey City, in the county of Hudson and State of New Jersey, have invented a certain new and useful Safety Device for Phonographs, of which the following is a specification.

This invention is a safety device for phonographs and is more particularly intended to be associated with the winding shaft thereof, for the purpose of precluding breakage of the spring motor of the machine in the event that an operator attempts to overwind.

The majority of people who own and operate phonographs have very little, if any, mechanical skill or knowledge of mechanics and have practically no knowledge whatsoever of the interior of the machine. Such persons generally believe that the tighter the spring motor of such machine is wound, the better and longer it will operate. As a result of this misbelief, there is a tendency on the part of most persons to wind the spring motor too tight and this tendency not infrequently results in the breaking of the spring or springs of the motor. As a matter of fact, a spring, for proper operation should not be wound too tightly, for, aside from the liability of breakage, the winding of a spring too tight causes friction which precludes the maximum efficiency of the spring under such conditions.

Accordingly, the object of the present invention is to provide means which may be associated either with a hand wound or mechanically or electrically wound machine, which will automatically obviate and preclude overwinding of the spring and in this way entirely overcome any tendency to breakage while maintaining the spring at its proper maximum efficiency, without producing undue strains thereon.

The present invention contemplates the positioning, between the prime mover and the spring winding spindle, of a clutch preferably of the friction type, so constituted that when the spring is in run down condition, the prime mover may be operated to wind the spring through the clutch which acts as a transmission element. However, this clutch is so organized that when the spring becomes fully wound, a resistance to further winding will be such that the clutch will slip, thereby precluding further winding of the spring even though the prime mover continues to operate.

With such construction, the overwinding of the spring is absolutely precluded, while the regulation of a desired tension may be accomplished through adjusting devices associated with the clutch.

Features of invention, other than those specified, will be apparent from the hereinafter detailed description and claims, when read in conjunction with the accompanying drawings.

The accompanying drawings illustrate different practical embodiments of the present invention, but the constructions therein shown are to be considered as illustrative, only, and not as defining the limits of the invention.

Figure 1 is a central section of clutch mechanism embodying the present invention and showing the manner in which the clutch may be interposed between the prime mover and the spring winding spindle.

Fig. 2 is an end view of the clutch viewed from the left hand side or Fig. 1.

Fig. 3 is an end view of one of the clutch elements.

Fig. 4 is a view similar to Fig. 1, but illustrating a modified form of clutch.

Fig. 5 shows a further modified arrangement; and,

Fig. 6 is a section on the line 6—6 of Fig. 5.

Referring to the drawings, and more particularly to Figs. 1 to 3, 1 designates the prime mover, here shown in the form of the usual winding handle, although, in practice, this prime mover may be an electric motor or any suitable mechanical device for winding the spring motor of the machine. 2 designates a spindle by means of which the spring motor may be wound, and 3 indicates a clutch embodying the present invention generally.

The clutch shown in Figs. 1 to 3 embodies a tubular cylindrical shell 4, one end of which is provided with an inwardly projecting flange 5, while its other end is interiorly threaded at 6 to receive a screw plug 7. Positioned within the tubular member or casing 4 are two clutch elements 8 and 9, complementary to one another and here shown as of the conical type. The element 8 is adapted to seat against the inner face of the flange 5 and is provided with a stem 10, which projects through the end of the casing 4 and is interiorly threaded at 11 to receive the threaded end 12 of the winding spindle 2. The other clutch element 9 is provided with a stem 13, which projects through a central opening in the threaded plug 7 and has a reduced end 14, which is threaded to receive the interiorly threaded hub 15 of the prime mover 1. A spring or other suitable tension member 16 is interposed between the body of the element 9 and the inner face of the threaded plug 7, so that by adjusting the plug 7 to place the spring 16 under more or less tension, the friction between the coöperating faces of the elements 8 and 9 may be regulated and the efficiency of the clutch may thus be controlled. The threaded plug 7 may thus be termed an adjusting element.

The periphery of the element 9 is provided with a longitudinal key way or slot 17 and a tapped hole is provided in the casing 4, through which may be screwed a set screw 18 adapted to coöperate with the key way to lock the element 9 and the casing 4 together for simultaneous rotation, while the element 8 is left without mechanical connection relative to the casing 4, so as to be capable of rotation relative thereto.

With this consideration, it will appear that when the parts are assembled, the operation of the prime mover 1 will effect simultaneous rotation of the casing 4 and clutch element 9, and, if the load on the spindle 2 is not too great to overcome the friction between the elements 8 and 9, the spindle 2 will also be rotated and the spring associated therewith wound. However, after the spring has become fully wound, the friction between the elements 8 and 9 will be inadequate to further wind the spring or cause breakage thereof, and, if the prime mover continues to operate, the element 9 will slip with reference to the element 8 and the spindle 2 remain stationary. The maximum winding of the spring may manifestly be regulated by the tension on the tension element 16 which manifestly regulates the friction between the clutch elements.

With this construction, it is impossible to overwind the spring, but as some persons would be apt to continue the winding as long as it was possible to turn the crank, I preferably employ with the device audible indicating means, whereby the operator may be advised when the spring is fully wound. Such audible indicating means may be readily associated with the device by forming the back face of the element 8 with ratchet teeth or depressions 19, after the manner shown in Fig. 3. With these depressions coöperates a pin 20 mounted for longitudinal movement through a hole in the flange 5 and against the outer end of which pin presses a leaf spring 21. So long as the spring motor is being wound, the clutch members 8 and 9 will rotate with the casing 4, but when the spring motor is fully wound, the clutch element 8 will stop. If the prime mover continues to operate the casing 4 will continue to revolve and in so doing will carry the inner end of the pin 20 over the ratchet teeth 19 of the element 8, thereby producing a sharp clicking sound, which will be amplified by the cabinet of the instrument and may be readily heard by an operator. Hearing this noise, the operator will know from previous instructions had, that the instrument is fully wound and further operation of the prime mover may be discontinued.

The construction shown in Fig. 4 is the same in all essential particulars to that shown in Figs. 1 to 3 with the exception that instead of providing two clutch elements coöperating directly with one another as shown in Fig. 1, the clutch element 8', which corresponds to the clutch element 8 coöperates with the clutch element 9', corresponding to the clutch element 9, through an intermediate floating clutch element 22. The clutch element 8' is locked against rotation relative to the casing 4' by a set screw 18'. A tension element 16' corresponds to the tension element 16 and may be regulated by an adjusting element 7', corresponding to the element 7. If desired, audible signaling means may also be associated with the construction of Fig. 4, after the manner shown in the modified arrangement of Fig. 5 by so associating it with the casing 4' that it will coöperate with the outer periphery of the clutch element 9'. This feature has, however, been omitted in the interest of clearness.

In the construction of Fig. 5, I have so formed a clutch that it will not only serve to preclude overwinding of the spring, but embodies means which will hold the tension of the spring, thereby obviating separate and independent means within the machine for this purpose. The two constructions hereinbefore described may be used as attachments to machines, but the construction of Figs. 5 and 6 is adapted to be incorporated in the machine during the building thereof. In this modified construction, the casing 4ª is outwardly flanged at 5ª and is adapted to be secured by screws 23 to some part 24 of the machine through which the operating spindle 2ª passes and carries at its outer end a clutch element 8ª, corresponding to the clutch element 8. With the clutch element 8ª, coöperates a clutch element 9ª, corresponding to the clutch element 9, and provided with an interiorly threaded stem 13ᵃ, which passes through an adjusting element 7ᵃ. A tension element 16ᵃ is interposed between the clutch element 8ᵃ and the clutch element 9ᵃ in frictional engagement. The prime mover is adapted to thread into the interiorly threaded stem 13ᵃ of the element 9ᵃ and when operated is adapted to frictionally drive the spindle 2ᵃ through the clutch element 8ᵃ. In order that back lash of the spring may be opposed, the periphery of the element 8ᵃ is formed as shown in Fig. 6, and is associated with a plurality of balls 25 forming therewith a ball ratchet. As long as the clutch element 8ᵃ operates in a clockwise direction, the winding of the spring may proceed, but, upon the slightest retrograde rotation, the balls 25 will lock the spring against unwinding. By embodying this construction in conjunction with the clutch member 8ᵃ, pawl and ratchet arrangements heretofore employed in conjunction with the spring are rendered unnecessary and a very neat, compact, and economical arrangement results.

I may incorporate the audible indicating feature in the construction of Fig. 5 by forming the outer periphery of the clutch element 9ᵃ with ratchet teeth and mounting a spring pressed plunger 20ᵃ in operative engagement therewith as shown, although this feature may be omitted if desired.

Having thus fully described the invention, what I claim as new and desire to secure by Letters Patent is:

1. A safety device for phonographs embodying a casing, a pair of coöperating cone clutch members positioned within the casing, a resilient means for maintaining said clutch members in frictional engagement with one another, one of said clutch members being freely rotatable in the casing, means for locking the other clutch member to the casing for rotation therewith, means associated with the freely rotatable clutch member for securing it to the winding shaft of the phonograph instrument, and means associated with the other clutch member for securing it to a winding crank, whereby the rotation of the handle will rotate all of the parts together, until the phonograph is wound up, whereupon the freely rotatable clutch member will cease to rotate while the other clutch member and the associated casing will continue to turn so long as the crank is operated because of slipping between the clutch members, in combination with means operating independently of the coacting faces of the clutch members for audibly indicating the rotation of the casing after the clutch member associated with the winding shaft has ceased to rotate.

2. A safety device for phonographs embodying a casing, a pair of coöperating cone clutch members positioned within the casing, one of which cone clutch members is provided with a toothed surface other than the cone surface of said member, means for yieldably forcing the cone surfaces of the two clutch members into coöperative engagement, means for locking one clutch member against rotation relative to the casing, each clutch member is adapted to be operated by a winding crank, the other clutch member being freely rotatable with reference to the casing and adapted to be associated with the winding spindle of the phonograph instrument, and spring pressed indicating means mounted on the casing and coöperating with the toothed face of the rotatable clutch member, whereby the operation of the winding crank will effect rotation of all of the parts together until the phonograph instrument is wound up, whereupon the cone clutch members will slip with respect to one another and permit the clutch member associated with the winding shaft to remain still, while the other clutch member and casing continue to rotate as long as the winding crank is operated, the indicating means automatically being brought into operation as soon as the winding shaft ceases to rotate.

3. A safety device for phonographs embodying a cup shaped casing provided interiorly at one end with an adjusting nut, a pair of coöperating cone clutch members positioned within the casing, a spring positioned intermediate the adjusting nut and the adjacent clutch member to yieldably maintain the conical surface of the clutch members in proper engagement, when the adjusting nut is regulated, a threaded shank, adapted to receive a winding crank, associated with one of the clutch members, means for locking said clutch member for rotation with the casing while permitting automatic adjustment of said clutch member longitudinally of the casing, the other clutch member being provided with a threaded socket to receive the threaded winding shaft of a phonograph instrument, and said latter clutch member being free to rotate with respect to the casing, whereby the operation of the crank will cause simultaneous rotation of all of the parts and a winding of the phonograph instrument, until said instrument is fully wound, whereupon the clutch member associated with the winding shaft will cease to rotate, while the other clutch member and casing will continue to rotate as long as the winding crank is operated, in combination with alarm means operable independently of the coacting faces of the clutch members and automatically brought into operation when the winding crank is rotated after the winding spindle ceases to rotate.

4. A safety device for phonographs embodying a friction clutch interposed between the spring motor and winding prime mover, said clutch being constituted to transmit power from the prime mover to the spring motor during the winding of the spring, until the spring is fully wound and thereafter to slip for the purpose of precluding the overwinding of the spring, and audible indicating means operating independently of the coöperating faces of the clutch and adapted to be automatically brought into operation in the event that the prime mover continues to operate after the spring is fully wound.

5. A safety device for phonographs embodying a casing, a pair of smooth faced cone clutch members positioned interiorly of the casing, means for yieldably maintaining the smooth conical surfaces of said clutch members in engagement with one another, one clutch member being locked to the casing for rotation therewith while free for automatic longitudinal adjustment therein and the other clutch member being rotatable with respect to the casing, the latter clutch member being provided with teeth on one of its parts other than the clutch face, an alarm member positioned exteriorly of the casing, and means coöperating with the toothed face of the rotatable clutch member for operating the alarm means, one of said clutch members being adapted to be associated with the winding shaft of the phonograph instrument and the other clutch member being adapted to be associated with the winding crank, whereby, when the crank is operated, all of the parts rotate simultaneously to effect rotation of the winding shaft, until the phonograph instrument is fully wound, whereupon further rotation of the crank effects a rotation of its associated clutch member and the casing while the other clutch member and winding shaft remain fixed for the purpose of actuating the alarm.

6. A safety device for phonographs embodying a friction clutch interposed between the spring motor and the winding prime mover, said clutch embodying two cone clutch members, one of which is provided at one of its parts other than the clutch face with teeth, a casing in which said clutch members are housed with one clutch member fixed against rotation with respect to the casing and the other clutch member having the teeth rotatable within the casing, a spring mounted on the exterior of the casing and a pin engaging with the teeth of the rotatable clutch member and also engaging with the spring, whereby the rotation of said clutch member within the casing effects reciprocation of the pin and causes the spring to strike the casing and serve as an audible alarm.

In testimony whereof, I have signed my name to this specification.

CHARLES H. KOLLING.